United States Patent [19]

Dickson, Jr. et al.

[11] 4,092,769
[45] June 6, 1978

[54] FIBER BUNDLE ENCAPSULATING APPARATUS

[75] Inventors: Thomas David Dickson, Jr., San Jose; Jeremy Corwin Wright, Palo Alto, both of Calif.

[73] Assignee: Alza Corporation, Palo Alto, Calif.

[21] Appl. No.: 676,752

[22] Filed: Apr. 14, 1976

[51] Int. Cl.² ............................................. B23P 19/04
[52] U.S. Cl. ........................................ 29/234; 29/235; 29/241; 29/433; 29/450
[58] Field of Search ................... 29/433, 451, 235, 241, 29/450, 234

[56] References Cited

U.S. PATENT DOCUMENTS

| 710,817 | 10/1902 | Stevens | 29/235 X |
| 2,958,126 | 11/1960 | Shaw et al. | 29/433 |
| 3,138,859 | 6/1964 | Edwards | 29/235 X |
| 3,139,677 | 7/1964 | Goldstein | 29/451 |
| 3,212,177 | 10/1965 | Thomas | 29/235 |

Primary Examiner—Charlie T. Moon
Attorney, Agent, or Firm—Thomas E. Ciotti; Paul L. Sabatine; Edward L. Mandell

[57] ABSTRACT

An apparatus and process for longitudinally encapsulating a bundle of aligned fibers within an elastomeric tube of smaller diameter than the normal diameter of the bundle in which: the tube is confined within a tubular inner channel of an openable casing, the diameter of the casing being at least as large as the normal diameter of the bundle; the ends of the tube are slipped over nipples at each end of the channel; air is pressured into the tube via one of the nipples thereby expanding the tube outwardly against the channel wall; the bundle of fibers is drawn through one of the nipples into the expanded tube; and the tube is depressurized to permit it to contract radially about the bundle of fibers.

4 Claims, 6 Drawing Figures

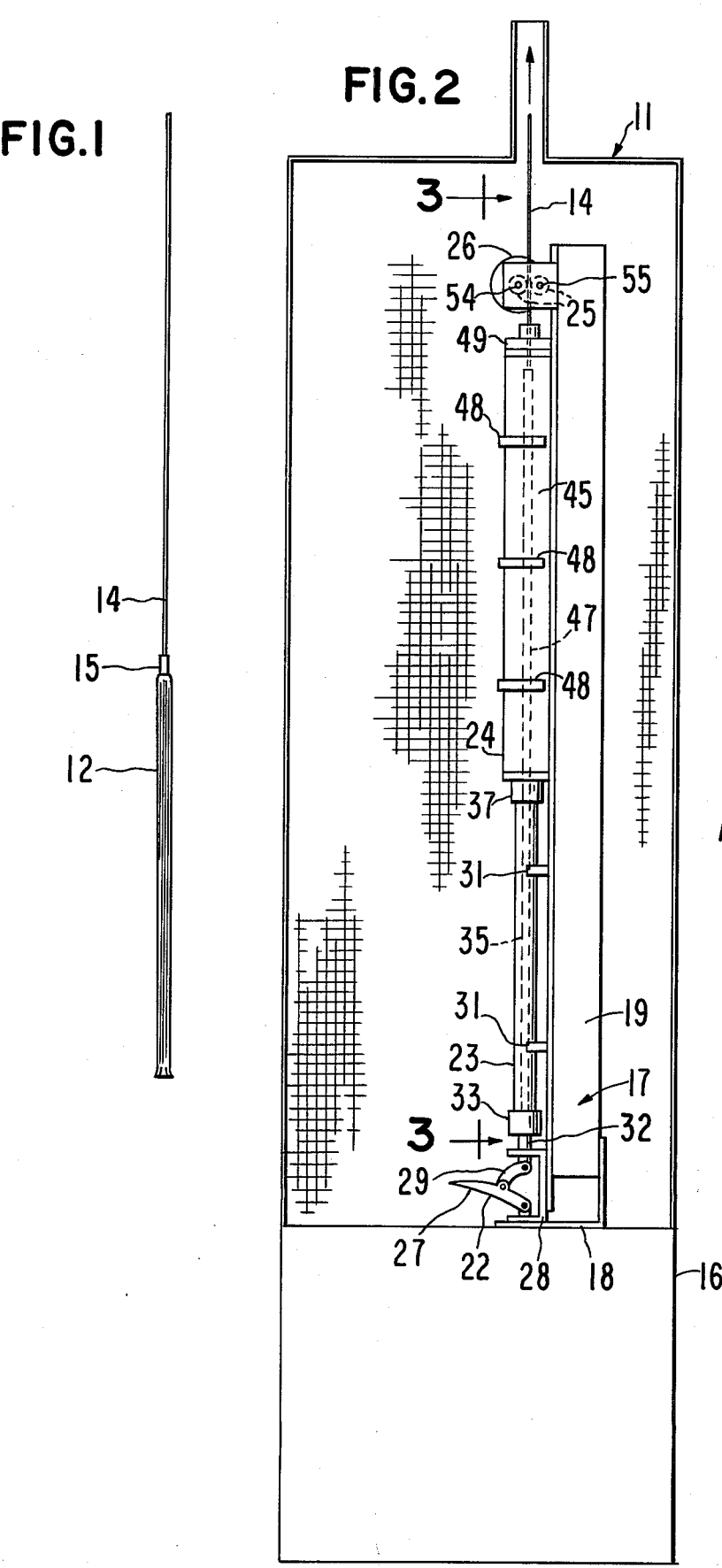

4,092,769

FIBER BUNDLE ENCAPSULATING APPARATUS

BACKGROUND OF THE INVENTION

1. Field of the Invention

This invention relates to an apparatus and process for longitudinally encapsulating a bundle of aligned fibers within an elastomeric tube.

2. Description of the Prior Art

The apparatus and process of the invention may be used to make encapsulated fiber bundles for use in the fluid flow control of U.S. Pat. No. 3,831,600. Such encapsulated fiber bundles comprise a plurality, usually several hundred, axially aligned Lycra Spandex fibers encapsulated axially within a Silastic (silicone rubber) sheath or tube.

SUMMARY OF THE INVENTION

One aspect of the invention is an apparatus for encapsulating a bundle of fibers aligned generally parallel to each other axially within an elastomeric tube having an unexpanded diameter smaller than the normal diameter of the bundle comprising in combination:

(a) a casing defining a tubular inner channel of diameter at least about equal to the normal diameter of the bundle, said casing being openable to expose said channel so that the elastomeric tube may be placed therein;

(b) a nipple at each end of the channel onto which the respective ends of the elastomeric tube are adapted to be sealingly placed;

(c) reversible pressurizing means connected to the bore of one of the nipples for generating sufficient pressure within the tube to temporarily expand the segment of the elastomeric tube between the nipples radially outwardly against the inner surface of the casing that defines the channel; and (d) means for drawing the bundle of fibers through one of the nipples into the radially expanded tube while maintaining said pressure.

A second aspect of the invention is a process for encapsulating a bundle of fibers aligned generally parallel to each other axially within an elastomeric tube having an unexpanded diameter smaller than the normal diameter of the bundle comprising:

(a) radially confining the elastomeric tube within a space of predetermined diameter at least about equal to the normal diameter of the bundle;

(b) pressurizing the interior of the elastomeric tube thereby causing it to expand radially to said predetermined diameter;

(c) drawing the bundle of fibers into the elastomeric tube while said tube is expanded radially to said predetermined diameter; and (d) depressurizing the interior of the elastomeric tube thereby causing the elastomeric tube to contract radially about the bundle of fibers and longitudinally encapsulate the bundle.

BRIEF DESCRIPTION OF THE DRAWINGS

In the drawings:

FIG. 1 is an elevational view of a fiber bundle assembly that is ready to be encapsulated using the apparatus and method of the invention;

FIG. 2 is a side elevational view of the apparatus for encapsulating the bundle of fibers of FIG. 1;

FIG. 3 is a front elevational view of a portion of the apparatus of FIG. 2 taken along line 3—3 of FIG. 2;

DESCRIPTION OF THE PREFERRED EMBODIMENT

Figure 5:
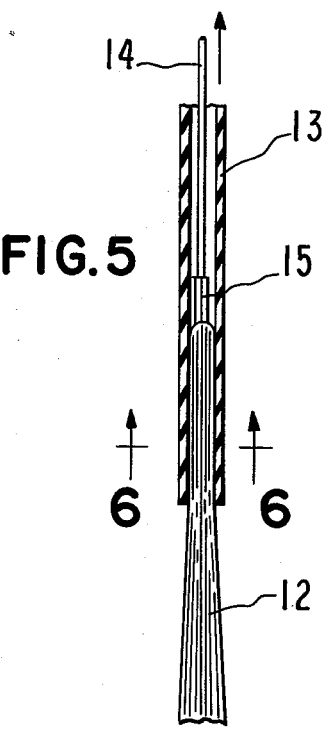
FIG. 5 is a sectional view of part of the bundle of fibers of FIG. 1 partly encapsulated in accordance with the invention.
Figure 6:
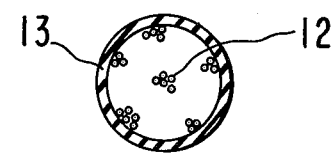
FIG. 6 is an enlarged sectional view taken along line 6—6 of FIG. 5.

The drawings illustrate the preferred embodiment of the invention apparatus. This embodiment, generally designated 11, may be used to encapsulate a bundle of fibers 12 within an elastomeric tube 13 (FIGS. 5 and 6). The unexpanded inner diameter of tube 13 is less than the diameter of the uncompressed bundle 12 (as seen in FIG. 1) so that the bundle 12 is compressed when it is encapsulated within tube 13. To ready bundle 12 for encapsulation one of its ends is clamped to a rod 14 with a clamp 15.

Apparatus 11 includes a frame 16 (FIG. 2) on which a support member, generally designated 17, comprising a base 18 and an upstanding T-shaped plate 19 is mounted. The functional parts of apparatus 11 are affixed to support member 17. These parts consist primarily of a lever clamp 22, a removable base insert tube 23, a casing 24, a pair of clamping wheels 25, and an electric motor 26 for driving wheels 25. Clamp 22 is composed of a handle 27 that is pivotally attached at one of its ends to a C-shaped plate 28 that is mounted on base 18, a link 29 that is pivotally attached at one of its ends to handle 22, a shank 32 that is pivotally attached to the other end of link 29, and a cup 33 on the leading (top) end of shank 32. Shank 32 extends up through a bore (not shown) in the top of C-shaped plate 28 and the recess of cup 33 is adapted to receive the bottom end of tube 23 in sealing engagement. A washer 34 is employed between the bottom end of tube 23 and cup 33 to provide an air-tight seal. Supports 31 mounted on plate 17 provide lateral support for tube 23.

Figure 4:
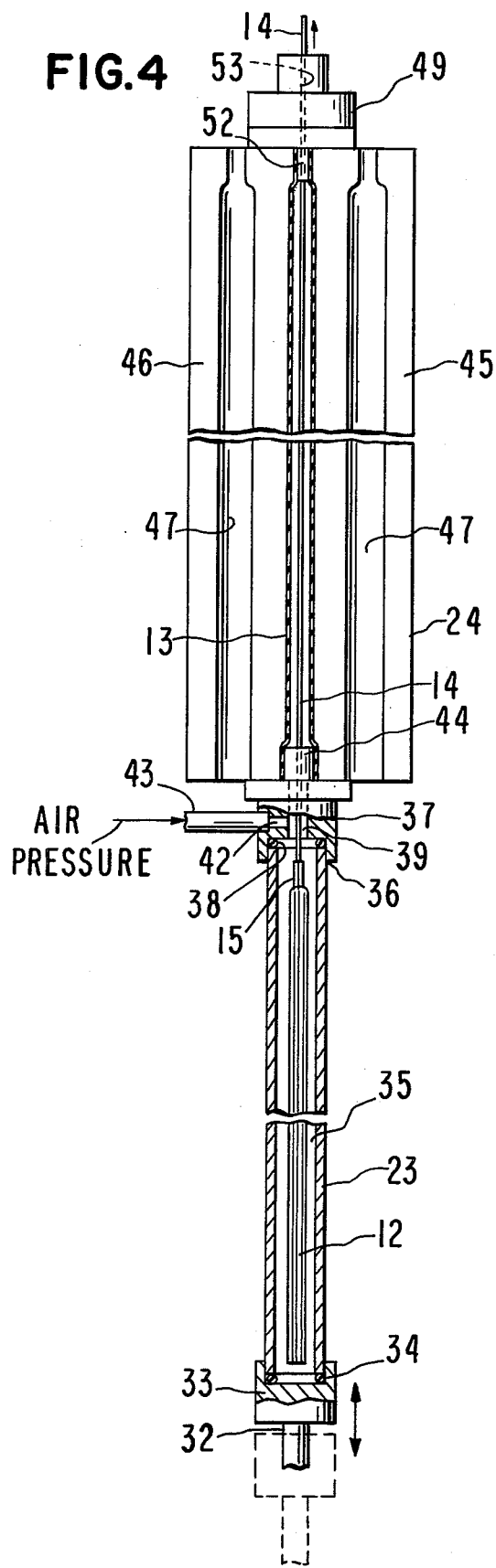
FIG. 4 is a partly sectional, enlarged view of the portion of the apparatus seen in FIG. 3.

Tube 23 has a central bore 35 that is large enough to easily accommodate the fiber bundle assembly of FIG. 1 in its uncompressed state (see FIG. 4). The diameter of the fiber bundle in its uncompressed state is elsewhere herein referred to as the "normal" diameter. Tube 23 is made of a pressure resistant material such as stainless steel. The top end of tube 23 is seated within counterbore 36 of a coupling 37 mounted on the bottom of casing 24. A washer 38 provides an air-tight seal between the top end of tube 23 and coupling 37. Coupling 37 has a main axial bore 39 and an intersecting radial side bore 42. One end of an air conduit 43 is attached to the outer end of side bore 42. The other end of conduit 43 is connected to a source of compressed air (not shown). The top end of coupling 37 terminates with an upwardly extending nipple 44 that extends into casing 24.

Casing 24 is composed of a pair of elongated parallelipiped doors 45,46 each of which has a semi-cylindrical, longitudinal channel formed in its inner face that together, when the doors are closed, (as seen in FIGS. 2-4) define a cylindrical longitudinal inner channel 47 that extends the length of casing 24. The diameter of channel 47 is approximately the same as or larger than the diameter of the uncompressed fiber bundle 12. Doors 45, 46 are hinged to plate 19 so that they may be swung open. Three C-shaped clamps 48 are used to hold doors 45,46 shut.

A gland assembly, generally designated 49, is positioned over the top end of doors 45,46. Assembly 49 has a nipple 52 that extends downwardly into channel 47. Channel 47 is flared radially inwardly at its upper end to fit closely about nipple 52. Assembly 49 also has an axial bore 53 that is large enough to accommodate rod 14; and a rubber gland (not shown) within bore 53 that forms an air-tight seal about rod 14.

Clamping wheels 25 are mounted above assembly 49 on shafts 54,55 that are journalled in flanges 56,57 attached to plate 19. Shaft 54 is also the driving shaft of motor 26. The purpose of clamping wheels 25 is to grip rod 14 and pull it upwardly as indicated by the single-head arrows in FIGS. 2–4. Motor 26 is connected to line voltage by appropriate wiring (not shown).

Apparatus 11 may be used to encapsulate fiber bundle 12 within tube 13 as follows. A length of tube is approximately as long as channel 47 is cut. Doors 45,46 are opened to expose nipples 44,52 and one end of the tube 13 is slipped over nipple 52 and the other end is slipped over nipple 44 with the assistance of a tapered guide tool (not shown). Doors 45,46 are then closed (tube 13 should be so slack that such closing is difficult) and C-clamps 48 are put in place to keep the doors shut. Tube 23 is removed from the apparatus 11 by lowering clamp 22 by moving handle 27 (shown in phantom in FIG. 4) and slipping the upper end of tube 23 out of counterbore 36. The fiber bundle assembly of FIG. 1 is then inserted up through tube 23, rod 14 first. Rod 14 is worked up through bore 37, channel 47, and bore 53 until it is engaged between and firmly held by clamping wheels 25 and the bottom of the fiber bundle 12 clears the lower end of tube 23. Tube 23 is then placed in support 31. Clamp 22 is raised by pivoting handle 27 upwardly, thereby forcing the upper end of tube 23 into counterbore 36 and up against washer 38. The raised position of clamp 22 is shown in solid line in FIG. 4. At this point the fiber bundle assembly is in the position shown in FIG. 4.

The source of compressed air is then opened to conduit 43 causing air to be forced through conduit 43 and radial bore 42 into axial bore 39 of coupling 37 and therethrough into tube 13 housed within channel 47 of casing 24. This causes the segment of tubing 13 that is between nipples 44,52 to expand outwardly until it is against the surfaces of doors 45,46 that define channel 47. Tube 23 is also pressurized by this action. Channel 47 should not be so large as to permit tubing 13 to balloon (expand nonuniformly radially). By so restricting the radial expansion of tubing 13 the chances of having relative axial elongation between the fiber bundle 12 and the tubing 13 are lessened greatly. In this regard significant relative elongation between tubing 13 and fiber bundle 12 may cause discontinuities, such as fiber crimping, in the flow control. With tube 13 thus expanded radially to a diameter that approximates or is larger than the uncompressed diameter of fiber bundle 12, electric motor 26 is turned on thereby causing clamping wheels 25 to rotate against rod 14 and draw the fiber bundle 12 up into the expanded tube 13. It is preferable that tubing 13 be expanded to a diameter such that there is little or no contact between the wall of tubing 13 and the fiber bundle 12 as the latter is drawn into the former. FIG. 5 shows fiber bundle 12 partly drawn up into tube 13 in this manner. Once the clamp 15 of the fiber bundle 12 reaches nipple 52 motor 26 is turned off and conduit 43 is closed to the source of compressed air and is vented slowly to atmospheric pressure thereby allowing tube 13 to contract about fiber bundle 12 so that the latter is tightly encapsulated within the former. Doors 45,46 are then opened and the encapsulated bundle cut free from nipples 44,52 with a scissors. The bundle may then be cut into segments of predetermined length for incorporation into the flow control of U.S. Pat. No. 3,831,600.

Modifications of the apparatus and process described above that are obvious to those of skill in the mechanical and related arts are intended to be within the scope of the following claims.

We claim:

1. An apparatus for encapsulating a bundle of fibers aligned generally parallel to each other axially within an elastomeric tube having an unexpanded diameter smaller than the normal diameter of the bundle comprising in combination:
    (a) a casing defining a tubular inner channel of diameter at least about equal to the normal diameter of the bundle, said casing being openable to expose said channel so that the elastomeric tube may be placed therein;
    (b) a nipple at each end of the channel onto which the respective ends of the elastomeric tube are adapted to be sealingly placed;
    (c) reversible pressurizing means connected to the bore of one of the nipples for generating sufficient pressure within the tube to temporarily expand the segment of the elastomeric tube between the nipples radially outwardly against the inner surface of the casing that defines the channel;
    (d) means for drawing the bundle of fibers through one of the nipples into the radially expanded tube while maintaining said pressure;
    (e) a removable tubular member adapted to receive and hold the bundle before the latter is drawn into the tube;
    (f) means for sealing one end of the tubular member against the exterior end of said one of the nipples with the bores of the tubular member and said one of the nipples aligned and open to each other; and
    (g) means for sealing by closing the other end of the tubular member.

2. The apparatus of claim 1 wherein the casing comprises a pair of doors that close against each other and means for holding the doors in a closed position.

3. The apparatus of claim 1 wherein the reversible pressurizing means comprises a valved source of compressed gas.

4. The apparatus of claim 1 wherein the means for drawing the bundle of fibers through one of the nipples into the tube comprises: a rod attached at one of its ends to one end of the bundle that is adapted to be inserted into and through said one of the nipples, through the tube, and through and out of the other end of the nipples; a pair of rotatable clamping wheels between which the other end of the rod is adapted to be gripped; and means for rotating the clamping wheels.

* * * * *